United States Patent
Jayaram

(10) Patent No.: US 9,189,795 B2
(45) Date of Patent: Nov. 17, 2015

(54) SELECTING CONTENT ITEMS FOR DISPLAY IN A CONTENT STREAM

(75) Inventor: Ranjith Jayaram, San Jose, CA (US)

(73) Assignee: Google Inc., Mountain View, CA (US)

( * ) Notice: Subject to any disclaimer, the term of this patent is extended or adjusted under 35 U.S.C. 154(b) by 546 days.

(21) Appl. No.: 13/442,065

(22) Filed: Apr. 9, 2012

(65) Prior Publication Data

US 2013/0268354 A1   Oct. 10, 2013

(51) Int. Cl.
  *G06Q 30/00*   (2012.01)
  *G06Q 30/02*   (2012.01)

(52) U.S. Cl.
  CPC ............ *G06Q 30/02* (2013.01); *G06Q 30/0251* (2013.01)

(58) Field of Classification Search
  CPC .................................................. G06Q 30/0251
  USPC ....................................................... 705/14.49
  See application file for complete search history.

(56) References Cited

U.S. PATENT DOCUMENTS

| | | | |
|---|---|---|---|
| 2010/0250332 A1* | 9/2010 | Ghosh et al. ..................... | 705/10 |
| 2010/0324990 A1 | 12/2010 | D'Angelo et al. | |
| 2011/0035277 A1* | 2/2011 | Kodialam et al. .......... | 705/14.46 |
| 2011/0231264 A1 | 9/2011 | Dilling et al. | |
| 2011/0295677 A1 | 12/2011 | Dhingra et al. | |

FOREIGN PATENT DOCUMENTS

| | | |
|---|---|---|
| KR | 10-2012-0015120 | 2/2012 |
| KR | 10-2012-0016465 | 2/2012 |
| WO | 2012-023725 | 2/2012 |

OTHER PUBLICATIONS

International Preliminary Report on Patentability mailed Oct. 23, 2014 in International Application No. PCT/US2013/035565, 7 pages.
International Search Report and Written Opinion mailed Jul. 23, 2013 in International Application No. PCT/US2013/035565, 10 pgs.

* cited by examiner

*Primary Examiner* — John G Weiss
*Assistant Examiner* — Scott C Anderson
(74) *Attorney, Agent, or Firm* — Fish & Richardson P.C.

(57) ABSTRACT

A method for selecting content items, comprising: receiving, using one or more processing devices, a request for content items for display in a content stream; retrieving, using the one or more processing devices, in response to the request, a condition for targeting a content item for display in the content stream; detecting, using the one or more processing devices, that the condition is satisfied; adjusting, using the one or more processing devices, the bid price in accordance with the condition; executing, using the one or more processing devices, an auction, based on the bid price adjusted and other bid prices for other content items in the auction; and selecting, using the one or more processing devices, based on the auction, the content items for display in the content stream.

24 Claims, 4 Drawing Sheets

SELECTING CONTENT ITEMS FOR DISPLAY IN A CONTENT STREAM

BACKGROUND

A web page may display content items. An advertisement is an example of a content item. Selection of the content items may be based on numerous factors, including, e.g., age, gender, profession, and income level of a viewer of the web page.

In an example, the web page includes content. In this example, the content may also be used in selecting the content items, e.g., by selecting content items that are relevant to the content in the web page.

SUMMARY

In one aspect of the present disclosure, a method for selecting content items, including: receiving, using one or more processing devices, a request for content items for display in a content stream; retrieving, using the one or more processing devices, in response to the request, a condition for targeting a content item for display in the content stream; wherein the condition is associated with information specifying an adjustment to a bid price for display of the content item upon satisfaction of the condition, relative to the bid price for display of the content item in an absence of the condition; detecting, using the one or more processing devices, that the condition is satisfied; adjusting, using the one or more processing devices, the bid price in accordance with the condition; executing, using the one or more processing devices, an auction, based on the bid price adjusted and other bid prices for other content items in the auction; and selecting, using the one or more processing devices, based on the auction, the content items for display in the content stream.

Implementations of the disclosure can include one or more of the following features. In some implementations, the method also includes generating measures of relevance for the content items in the auction; wherein a measure of relevance is based on a satisfaction of the condition by one or more of attributes of a user viewing the content stream and attributes of the content stream; wherein executing the auction includes: executing the auction based on the measures of relevance and the bid prices. In other implementations, the content stream is designated for display of content related to a media program that is accessed by a viewer of the content stream.

In still other implementations, the condition includes the content item being displayed in the content stream to counteract an effect of another, different content item displayed during the media program. In some implementations, the content item includes a first content item, and wherein the condition includes: the first content item being displayed at a substantially same time in the content stream as a second content item is displayed during the media program.

In some implementations, the condition includes information indicative of a type of content to be targeted, and the method further includes: receiving, from a device for display of the media program, information indicative of a station on which the media program is accessed; identifying, based on the station, an identity of the media program accessed by the viewer; and determining, based on the identity of the media program, a correspondence between the type of content to be targeted and a type of content associated with the media program accessed by the viewer.

In yet other implementations, the condition includes one or more of: one or more attributes of a viewer of the content stream; one or more attributes of a group that is generating content for the content stream; content that is posted in the content stream; and content of a media program that is accessed by the viewer of the content stream. In still other implementations, at least one of the content items selected includes the content item associated with the condition, and wherein the method further includes: transmitting, to a device for rendering a visual representation of the content stream, the content items for display in the content stream.

In still another aspect of the disclosure, one or more machine-readable media are configured to store instructions that are executable by one or more processing devices to perform operations including receiving a request for content items for display in a content stream; retrieving in response to the request, a condition for targeting a content item for display in the content stream; wherein the condition is associated with information specifying an adjustment to a bid price for display of the content item upon satisfaction of the condition, relative to the bid price for display of the content item in an absence of the condition; detecting that the condition is satisfied; adjusting the bid price in accordance with the condition; executing an auction, based on the bid price adjusted and other bid prices for other content items in the auction; and selecting, based on the auction, the content items for display in the content stream. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving a request for content items for display in a content stream; retrieving in response to the request, a condition for targeting a content item for display in the content stream; wherein the condition is associated with information specifying an adjustment to a bid price for display of the content item upon satisfaction of the condition, relative to the bid price for display of the content item in an absence of the condition; detecting that the condition is satisfied; adjusting the bid price in accordance with the condition; executing an auction, based on the bid price adjusted and other bid prices for other content items in the auction; and selecting, based on the auction, the content items for display in the content stream. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated operations.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Definitions

Figure 1:
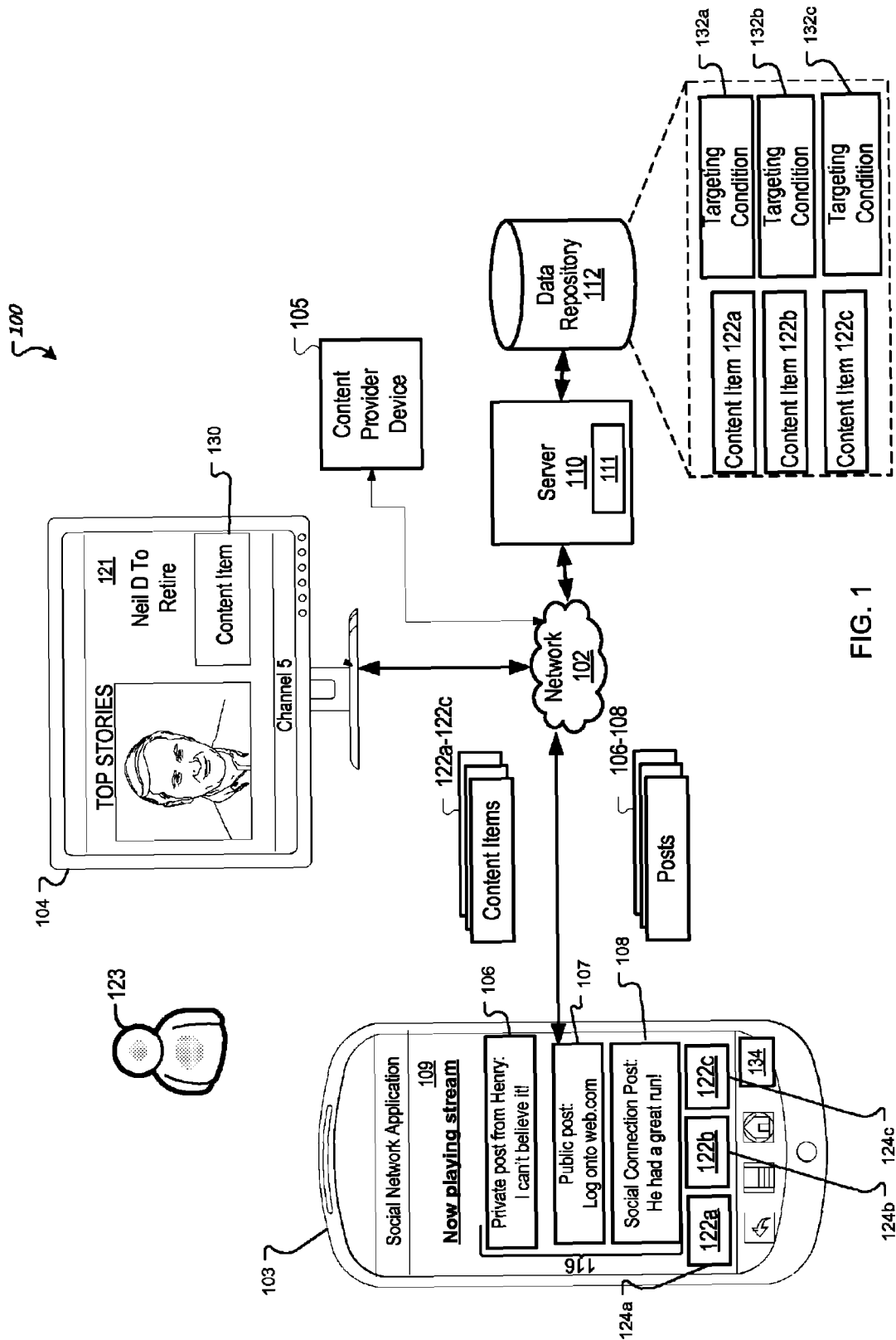
FIG. 1 is a diagram of an example of a network environment for selecting content items for a content stream.

The term "content stream" as used herein encompasses its plain and ordinary meaning, including, but not limited to, electronic (e.g., Web-based) content displayed in a portion of a graphical user interface designated for display of the electronic content, including, e.g., posts, links, images, and so forth.

The term "now playing content stream" as used herein encompasses its plain and ordinary meaning, including, but not limited to, a content stream that is designated for display of information related to a media program.

The term "social networking service" as used herein encompasses its plain and ordinary meaning, including, but not limited to, a platform that promotes building of social connections, e.g., among people with shared interests and/or activities.

The term "social connection" as used herein encompasses its plain and ordinary meaning, including, but not limited to, a relationship between nodes in a graph representing users of the social networking service.

The term "media program" as used herein encompasses its plain and ordinary meaning, including, but not limited to, an electronic presentation for communication of information. Types of media programs include music programs, television programs, Internet programs, radio programs, and so forth.

The term "media program device" as used herein encompasses its plain and ordinary meaning, including, but not limited to, a device configured to access a media program.

The term "content provider device" as used herein encompasses its plain and ordinary meaning, including, but not limited to, a device used by a provider of content items (e.g., a device used by an advertiser).

The term "slot" as used herein encompasses its plain and ordinary meaning, including, but not limited to, a portion of a graphical user interface in which content items can be presented.

The term "auction" as used herein encompasses its plain and ordinary meaning, including, but not limited to, a technique for allocating content items to slots.

The term "bid price" as used herein encompasses its plain and ordinary meaning, including, but not limited to, an amount that a content provider is willing to pay for presentation of a content item in a slot.

The term "targeting condition" as used herein encompasses its plain and ordinary meaning, including, but not limited to, a condition that is used in targeting a content item to a user.

The term "selection score" as used herein encompasses its plain and ordinary meaning, including, but not limited to, a value based, in part, on a bid price and a measure of relevance of a content item to contents of a resource.

The term "resource" as used herein encompasses its plain and ordinary meaning, including, but not limited to, item(s) of data that can be provided over a network. Resources include content streams, HTML pages, word processing documents, portable document format (PDF) documents, images, video, applications, feed sources, and so forth.

The term "targeting keyword" as used herein encompasses its plain and ordinary meaning, including, but not limited to, a word that a content provider has specified as relevant to a content item.

The term "browsing history" as used herein encompasses its plain and ordinary meaning, including, but not limited to, a record of resources accessed by a user.

The term "viewing history" as used herein encompasses its plain and ordinary meaning, including, but not limited to, information indicative of media programs that have been viewed by a user within a pre-defined period of time.

The term "one-two punch content item" as used herein encompasses its plain and ordinary meaning, including, but not limited to, one or more content items with coordinated display on different devices, e.g., content items displayed at a substantially same time on the different devices. The coordinated display of the content items promotes user attention to the content items.

The term "meta content item" as used herein encompasses its plain and ordinary meaning, including, but not limited to, a content item about another content item.

The term "counter punch content item" as used herein encompasses its plain and ordinary meaning, including, but not limited to, a content item that counteracts an effect of another, different content item. For example, a "counter punch content item" may be an advertisement that is displayed to counter or react to a competitor's advertisement.

The term "correspondence" as used herein encompasses its plain and ordinary meaning, including, but not limited to, a match, a similarity, and/or a relationship among items of data.

The term "estimated click-through likelihood" (eCTL) as used herein encompasses its plain and ordinary meaning, including, but not limited to, a probability that a content item is selected by a user in response to a particular presentation of the content item.

The term "threshold value" as used herein encompasses its plain and ordinary meaning, including, but not limited to, a pre-defined value.

The term "processing device" as used herein encompasses its plain and ordinary meaning, including, but not limited to, one or more microprocessors, microcontrollers and/or programmable or non-programmable logic that is capable of receiving and storing data, and of communicating over a network.

The term "computing device" as used herein encompasses its plain and ordinary meaning, including, but not limited to, a programmable machine that is capable of receiving input data, processing the data, and providing an output.

Overview

Described herein is a system that selects content items for display in a content stream of a social networking service, including, e.g., a now playing content stream. In some embodiments, a user may have access to or be watching multiple content streams (e.g., a television stream and a now playing stream on a social networking website). Various embodiments herein provide for displaying the same content item (e.g., an advertisement) to the user simultaneously (termed, e.g., a "one-two punch"). In this example, display of the content items is coordinated among the devices.

In some embodiments, a user may be viewing a content stream (e.g., a video on a website), and may have a content item displayed to the user during that viewing. The content item may be, for example, an advertisement for a particular advertiser. Another advertiser (e.g., a competitor) may want to provide a "counter punch" to that first advertisement and may bid higher for the option to counter the first advertisement. For example, and referencing FIG. 1, if a political candidate advertised using content item 130 in content stream 116, then an opposing candidate may want to "counter punch" by advertising using content item 122a in the content stream 116. Therefore, the opposing candidate may set a condition in the auction process to increase the bid for its advertisement if the opponent has just advertised.

Example Network Environments

FIG. 1 is a diagram of an example of network environment 100 for selecting content items for a content stream. Network environment 100 includes network 102, client device 103, media program device 104, content provider device 105, server 110, data repository 112, and user 123. In the example of FIG. 1, media program device 104 accesses media program 121. User 123 may use client device 103 and media program device 104. In the example of FIG. 1, user 123 views media program 121 on media program device 104.

Client device 103 and content provider device 105 can communicate with server 110 over network 102. Network environment 100 may include many thousands of data repositories, client devices, content provider devices, and servers, which are not shown. Server 110 may include various data engines, including, e.g., data engine 111. Although data engine 111 is shown as a single component in FIG. 1, data engine 111 can exist in one or more components, which can be distributed and coupled by network 102.

In an example, client device 103 includes application 134 for accessing a social networking service (not shown). In this example, the social networking service may be hosted by server 110. Application 134 generates data for displaying graphical user interface 109 on client device 103. Graphical user interface 109 can display various aspects of the social networking service, including, e.g., a listing of social connections of user 123, a listing of recent activity of user 123 in the social networking service, various content streams that are generated by the social networking service, and so forth.

In this example, the social networking service may be configured to generate various, different types of content streams. For example, the social networking service may be configured to generate a content stream for display of recent activity of users with social connections to user 123. In another example, the social networking service is configured to generate a now playing content stream, including, e.g., content stream 116. In this example, content stream 116 includes a content stream that is designated for display of content related to media program 121.

In the example of FIG. 1, user 123 accesses media program 121 on media program device 104. In this example, user 123 instructs application 134 to display content stream 116 for media program 121. In this example, content stream 116 is populated with content related to media program 121. For example, content stream 116 may be populated with various types of content, including, e.g., posts, links, images, and so forth. In the following examples, content stream 116 is populated with posts 106, 107, 108. In other examples, content stream 116 is populated with various, different types of content, including, e.g., posts, links, and images (or any combination thereof).

In this example, posts 106, 107, 108 are stored in data repository 112. Posts 106, 107, 108 are retrieved by data engine 111, e.g., in response to a request (not shown) from application 134 for content related to media program 121 for display in content stream 116. In an example, the request is generated in response to user 123 selecting a control (not shown) in graphical user interface 109 for display of content stream 116. In another example, the request is automatically generated when application 134 starts up.

In an example, content stream 116 includes slots 124a-124c. In the example of FIG. 1, a content provider (e.g., an advertiser) uses content provider device 105 to upload content items 122a-122c to server 110. Content items 122a-122c are stored in data repository 112.

In an example, server 110 selects content items 122a-122c for display in slots 124a-124c, e.g., based on results of an auction. In an auction, the content provider specifies bid prices (not shown) for placement of content items 122a-122c in slots 124a-124c.

In addition to specifying bid prices for content items 122a-122c, content providers also specify targeting conditions 132a-132c to be used in selecting content items 122a-122c, respectively, for display in slots 124a-124c. In an example, server 110 provides a content provider with data for a graphical user interface (not shown) through which the content provider may specify targeting conditions 132a-132c for content items 122a-122c and may also specify bid prices for content items 122a-122c. Based on the bid prices and targeting conditions 132a-132c for content items 122a-122c, data engine 111 executes an auction by generating selections scores, as described in further detail below.

As described above, a content provider uses content provider device 105 to upload to server 110 targeting conditions 132a-132c for content items 122a-122c, respectively. There are various types of targeting conditions 132a-132c, including, e.g., targeting keywords. As described in further detail below, data engine 111 may use targeting keywords in generating measures of relevance for content items 122a-122c.

Other types of targeting conditions 132a-132c may be based on attributes of viewers (e.g., user 123) of content stream 116, attributes of groups that post information in content stream 116, contents of content stream 116, contents of media program 121, and so forth, as described in further detail below.

In an example, targeting conditions 132a-132c may include information specifying that content items 122a-122c are targeted to users having particular attributes (e.g., attributes that are defined by a content provider). For example, attributes of user 123 may include interests of user 123, e.g., as specified by a profile for user 123 in the social networking service. As described in further detail below, user 123 may opt-in or may opt-out of having information from a profile of user 123 (and/or other personal information) used in an auction for selecting content items 122a-122c.

Targeting conditions 132a-132c may also include information specifying that content items 122a-122c are targeted to users associated with particular demographic information. In this example, data repository 112 may be configured to store demographic information for users of the social networking service. For example, the demographic information may be based on profiles of the users of the social networking service. During an auction, data engine 111 accesses the demographic information to determine users that are associated with demographic information corresponding to targeting conditions 132a-132c. As described in further detail below, user 123 may opt-in or may opt-out of having demographic information of user 123 used in an auction.

Targeting conditions 132a-132c may also include information targeting content items 122a-122c to users associated with particular types of browsing history. In still another example, targeting conditions 132a-132c specify that content items 122a-122c are targeted to users associated with a particular type of viewing history. In the example, targeting conditions 132a-132c may specify that content items 122a-122c are targeted to users watching a particular type of media program, e.g., a baseball game.

In another example, targeting conditions 132a-132c may target content items 122a-122c based on attributes of groups that are participating in content stream 116 groups with which user 123 has a social connection, and so forth. In this example, a group participates in content stream 116 by posting content in content stream 116, by viewing content in content stream 116, and so forth. Attributes of a group may include interests of the group, demographic information of the group, browsing history of the group, and so forth.

In still another, targeting conditions 132a-132c specify that content items 122a-122c are targeted for display in content stream 116, e.g., based on a type of content that is shown in media program 121. In another example, targeting conditions 132a-132c may include information targeting display of content items 122a-122c in content stream 116, e.g., when a particular type of content is displayed in content stream 116.

Numerous other types of targeting conditions 132a-132c also exist, including, e.g., display of one or more of content items 122a-122c as a one-two punch content item. In an example, targeting conditions 132a, 132b specify that content items 122a, 122b are displayed as one-two punch content items. In this example, content item 122a is selected for display on client device 103, when content item 122b is displayed on media program device 104. In another example, one-two punch content items include a content item that is displayed on media program device 104 and a meta content item that is displayed in content stream 116.

For example, media program device 104 displays content item 130 during media program 121. In this example, content item 130 includes a content item for a product. In this example, content item 122a is displayed in content stream 116 and includes a meta content item for content item 130. Content item 122a includes a link through which user 123 may purchase the product that is advertised in content item 130. Content item 122a is displayed in content stream 116 at a substantially same time as content item 130 is displayed in media program device 104.

In still another example, targeting condition 132a specifies that content item 122a is displayed as a one-two punch content item, e.g., by being displayed in content stream 116 after a pre-defined period of time has elapsed from when content item 122a is displayed during media program 121. In this example, display of content item 122a as a one-two punch content item promotes user attention to content item 122a, e.g., by displaying content item 122a during media program 121 and then repeating display of content item 122a in content stream 116.

In another example, a content provider may want to display content item 122a in content stream 116 and during media program 121 at a substantially same time. In this example, targeting condition 132a specifies that content item 122a may be displayed as a one-two punch content item, e.g., by being displayed at a substantially same time in content stream 116 and during media program 121.

Another type of targeting condition 132a includes display of content item 122a as a counter punch content item. In an example, targeting condition 132a includes information specifying that content item 122a may be displayed as a counter punch content item to content item 130.

In an example, content item 130 is shown during media program 121 and includes a content item for a baseball team. Content item 122a includes a content item for another baseball team that is a competitor of the baseball team featured in content item 130. In this example, a content provider may counteract the effect of content item 130, e.g., by displaying content item 122a in content stream 116.

As shown in the below Table 1, a content provider may specify an adjustment to a bid price for display of content item 122a in content stream 116 when targeting condition 132a is satisfied, e.g., relative to a bid price for display of content item 122a in content stream 116 in independent of satisfaction of targeting condition 132a (e.g., in an absence of targeting condition 132a). In the below Table 1, the adjustment to the bid price includes an increase in the bid price. In other examples, the bid price is adjusted by other types of adjustments, including, e.g., a decrease in the bid price.

TABLE 1

| Targeting Condition 132a | % increase in bid price |
| --- | --- |
| Attributes of User | 10% increase in bid price |
| Attributes of Group | 10% increase in bid price |
| One-two punch content item | 20% increase in bid price |
| Counter punch content item | 25% increase in bid price |

The above Table 1 includes amounts by which the bid price for display of content item 122a in content stream 116 is increased when targeting condition 132a is satisfied, e.g., relative to the bid price for display of content item 122a independent of satisfaction of targeting condition 132a. For example, targeting condition 132a may specify attributes of users that the content provider wants to target with content item 122a. As shown in the above Table 1, when user 123 possesses the content provider specified attributes, the bid price for display of content item 122a in content stream 116 is increased by 10%, e.g., relative to the bid price for display of content item 122a in content stream 116 when user 123 possesses attributes other than those specified in targeting condition 132a.

In another example, targeting condition 132a may specify attributes of groups that the content provider wants to target with content item 122a. As shown in the above Table 1, when a group that is posting content to content stream 116 possesses the content provider specified attributes, the bid price for display of content item 122a is increased by 10%, e.g., relative to the bid price for display of content item 122a in content stream 116 when the group possesses attributes other than those specified in targeting condition 132a.

In another example, targeting condition 132a includes content item 122a being displayed as a one-two punch content item. To promote display of advertisement 122a as a one-two punch content item, the content provider increases the bid price by 20% for display of content item 122a as a one-two punch content item, e.g., relative to the bid price independent of content item 122a being displayed as a one-two punch content item.

In another example, targeting condition 132a includes content item 122a being displayed as a counter punch content item, e.g., a counter punch content item to content item 130. As shown in the above Table 1, the content provider increases the bid price by 25% for display of content item 122a as a counter punch content item, e.g. relative to the bid price independent of content item 122a being displayed as a counter punch content item.

In an example, targeting condition 132a may include a collection of individual targeting conditions, which are collectively referred to herein as targeting condition 132a, for purposes of convenience. In this example, targeting condition 132a includes (i) information specifying that content item 122a is displayed as a counter punch content item, and (ii)

information specifying that content item 122a is displayed to users associated with particular attributes defined by a content provider.

In this example, data engine 111 detects satisfaction of each of the individual targeting conditions within targeting condition 132a for content item 122a. In this example, the bid price of content item 122 is cumulatively increased based on satisfaction of the individual targeting conditions within targeting condition 132a, e.g., relative to the bid price independent of satisfaction of the individual targeting conditions.

For example, data engine 111 detects satisfaction of an individual targeting condition within targeting condition 132a, in which content item 122a is displayed as a counter punch content item. As shown in the above Table 1, data engine 111 increases the bid price by 25% for display of content item 122a as a counter punch content item, e.g. relative to the bid price independent of content item 122a being displayed as a counter punch content item.

Data engine 111 also detects that user 123 is associated with attributes that are specified by the other individual targeting condition within targeting condition 132a. In accordance with increases in bid prices based on detection of attributes of users, as specified by Table 1, data engine 111 increases by an additional 10% the bid price that has already been increased by 25%.

As previously described, data engine 111 generates selection scores based on bid prices and measures of relevance. In an example, a measure of relevance of content item 122a to contents of content stream 116 is based on numerous factors, including, e.g., a correspondence among targeting condition 132a and contents of content stream 116.

As previously described, targeting condition 132a may include targeting keywords, attributes of viewers (e.g., user 123) of content stream 116, attributes of groups that post information in content stream 116, and information targeting users associated with particular demographic information.

Targeting condition 132a may also include information targeting a content item to users associated with particular types of browsing history. In still another example, targeting condition 132a specifies that content item 122a is targeted to users associated with a particular type of viewing history.

In an example, the browsing history of user 123 is used in generating the measure of relevance for content item 122a. In this example, targeting condition 132a specifies that content item 122a is targeted to users with a browsing history of viewing sports related content. In this example, content item 122a is a content item related to sports programs. As indicated by the browsing history, user 123 has a history of viewing sports related web sites. Based on the browsing history of user 123, data engine 111 generates an increased measure of relevance for content item 122a for display in content stream 116, e.g., relative to other measures of relevance for other content items to be displayed in content stream 116.

Using the measure of relevance of content item 122a to the contents of content stream 116, data engine 111 generates a value indicative of eCTL for content item 122a. For example, an eCTL of 0.30 for content item 122a can specify that there is a 30% likelihood that content item 122a will be selected by user 123 if presented in content stream 116.

Based on the measures of relevance and the bid prices, data engine 111 executes an auction by generating selection scores for content items 122a-122c. For example, a selection score for content item 122a includes a product of a bid price for content item 122a and the eCTL for advertisement 122a. As described above, the bid price for content item 122a may vary, based on detection of targeting condition 132a, including, e.g., user interests and/or demographics, group interests and or demographics, conditions in which content item 122a may be displayed as a counter punch content item, conditions in which content item 122a may be displayed as a one-two punch content item, as so forth.

Once the auctioning is complete, data engine 111 identifies content items 122a-122c with increased selection scores, e.g., relative to selection scores of other content items (not shown) participating in the auction. Server 110 provides content items 122a-122c to client device 103 for display in slots 124a-124c of content stream 116.

In an example, server 110 executes auctions in real-time, e.g., as the contents of content stream 116 change, as the groups that are posting content in content stream 116 changes, as the content of media program 121 changes, as the content items displayed during media program 121 changes, and so forth.

In another example, data engine 111 uses contents of posts 106-108 in selecting one or more of content items 122a-122c for display in slots 124a-124c. In this example, the content items selected for display in slots 124a-124c may change, e.g., as content stream 116 is updated with additional content that differs from posts 106-108.

In a variation of FIG. 1, network environment 100 includes a content item management system (not shown) for selecting content items 122a-122c for display in slots 124a-124c. In this example, the content item management system may be external to network environment 100 or may be internal to network environment 100 (and/or may be integrated with server 110). In an example, the content item management system selects content items 122a-122c in response to a request for content items, e.g., that is sent from client device 103. When client device 103 accesses from server 110 information for display of content stream 116, client device 103 sends to the content item management system the request for content items 122a-122c.

The request for content items can include characteristics of slots 124a-124c. The characteristics may include sizes of slots 124a-124c, and/or media types that are eligible for presentation in slots 124a-124c. The request for the content items can also include contents of content stream 116, e.g., to promote selection of content items that are relevant to content stream 116.

Example System Implementations

Figure 2:
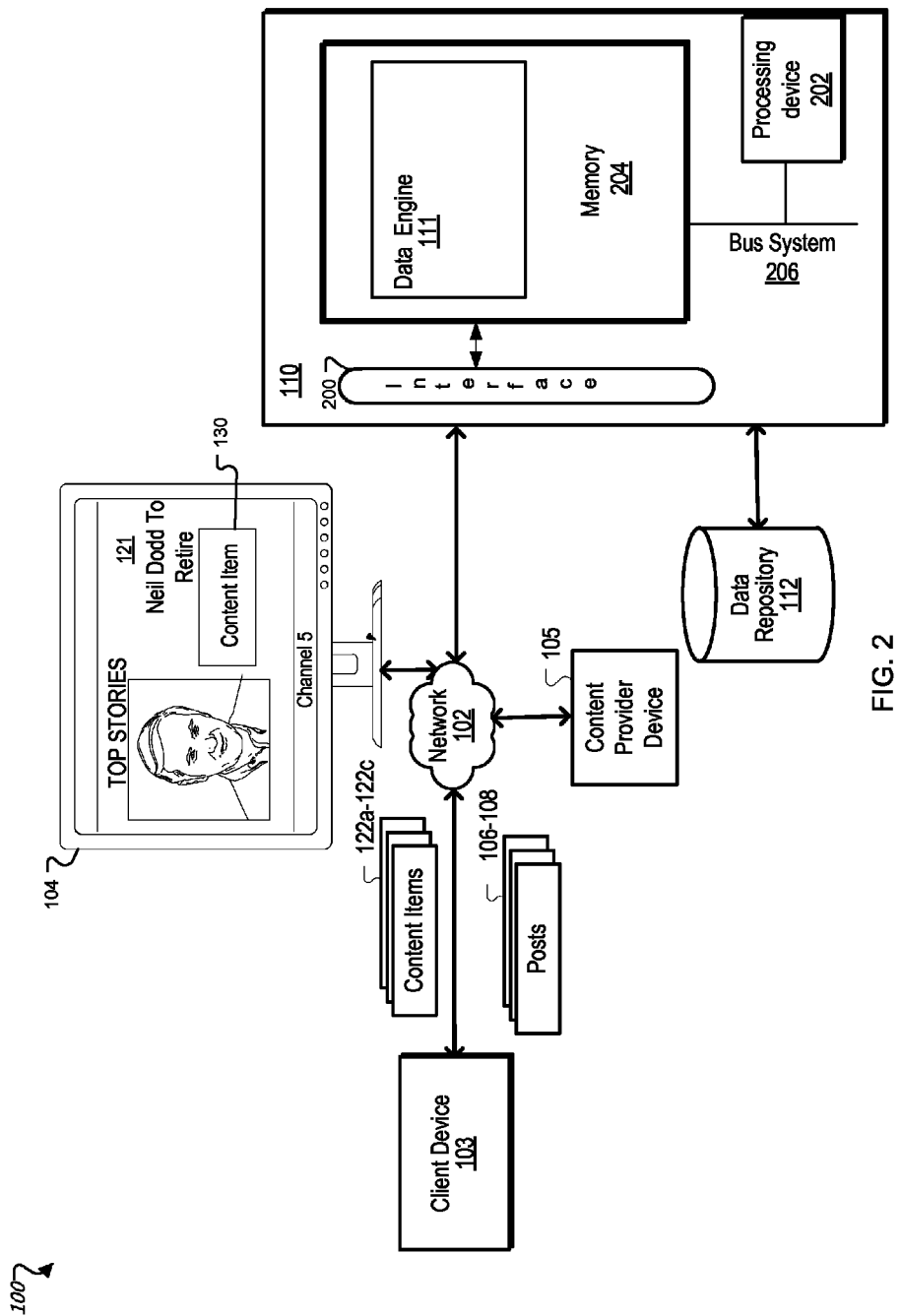
FIG. 2 is a block diagram showing examples of components of a network environment for selecting content items for a content stream.

FIG. 2 is a block diagram showing examples of components of network environment 100 for populating content stream 116. In the example of FIG. 2, graphical user interface 109, contents of graphical user interface 109, user 123, and contents of data repository 112 are not shown.

Client device 103 can be a computing device capable of taking input from user 123 (FIG. 1) and communicating over network 102 with server 110 and/or with other computing devices. For example, client device 103 can be a mobile device, a desktop computer, a laptop, a cell phone, a personal digital assistant (PDA), a server, a television with one or more processors embedded therein and/or coupled thereto, an embedded computing system, a mobile device, and the like. Network environment 100 can include a plurality of computing devices, which can be geographically dispersed.

Network 102 can include a large computer network, including, e.g., a local area network (LAN), wide area network (WAN), the Internet, a cellular network, or a combination thereof connecting a number of mobile computing devices, fixed computing devices, and server systems. The network(s) may provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, including, e.g., using a Bluetooth, WiFi, or other such transceiver.

Server 110 can be a variety of computing devices capable of receiving data and running one or more services, which can be accessed by client device 103 and/or by content provider device 105. In an example, server 110 can include a server, a distributed computing system, a desktop computer, a laptop, a cell phone, a rack-mounted server, and the like. Server 110 can be a single server or a group of servers that are at a same location or at different locations. Client device 103 and server 110 can run programs having a client-server relationship to each other. Although distinct modules are shown in the figures, in some examples, client and server programs can run on the same device.

Content provider device 105 can include a server, a distributed computing system, a desktop computer, a laptop, a cell phone, a rack-mounted server, and the like. Content provider device 105 can be a single server or a group of servers that are at a same location or at different locations.

Server 110 can receive data from client device 103 and content provider device 105 (and/or from data repository 112) through input/output (I/O) interface 200. I/O interface 200 can be a type of interface capable of receiving data over a network, including, e.g., an Ethernet interface, a wireless networking interface, a fiber-optic networking interface, a modem, and the like. Server 110 also includes a processing device 202 and memory 204. A bus system 206, including, for example, a data bus and a motherboard, can be used to establish and to control data communication between the components of server 110.

Processing device 202 can include one or more microprocessors. Memory 204 can include a hard drive and a random access memory storage device, including, e.g., a dynamic random access memory, or other types of non-transitory machine-readable storage devices. As shown in FIG. 2, memory 204 stores computer programs that are executable by processing device 202. These computer programs include data engine 111. Data engine 111 can be implemented in software running on a computer device (e.g., server 110), hardware or a combination of software and hardware.

Example Processes

Figure 3:
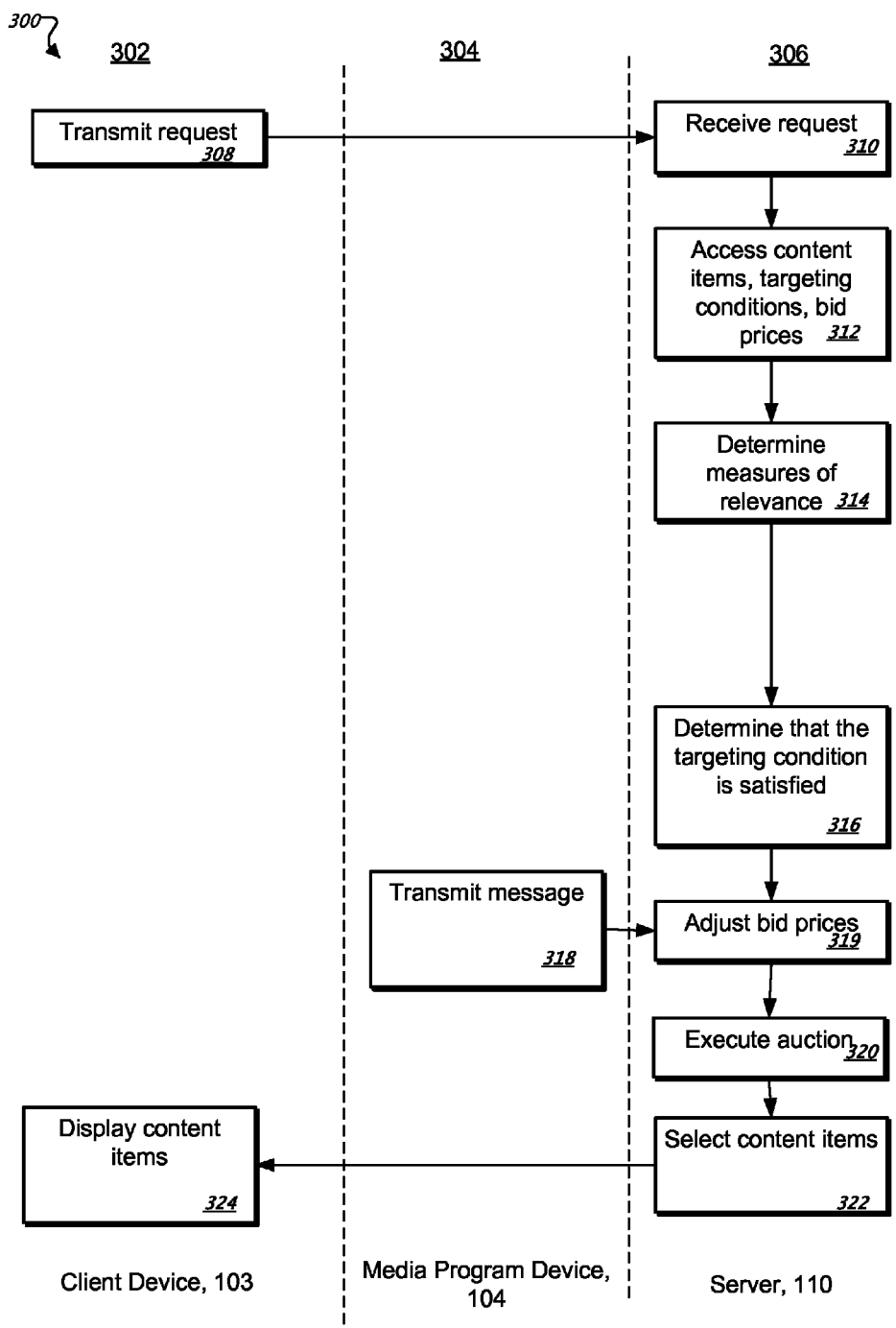
FIG. 3 is a flowchart showing an example process for selecting content items for a content stream.

FIG. 3 is a flowchart showing an example process 300 for selecting content items 122a-122c for content stream 116. In FIG. 3, process 300 is split into a left part 302, which is performed on client device 103 (and/or by application 134 on client device 103), a center part 304, which is performed on media program device 104, and a right part 306, which is performed on server 110 (and/or by data engine 111 on server 110).

In operation, a request (not shown) for content items 122a-122c for display in slots 124a-124c of content stream 116 is transmitted (308). For example, application 134 may transmit (308) to server 110 the request for content items 122a-122c for display in slots 124a-124c of content stream 116. The request may include information identifying user 123 (e.g., a user identifier for user 123 in the social networking service), information indicative of contents of content stream 116, including, e.g., contents of posts 106, 107, 106, groups that are posting in content stream 116, and so forth.

The request is received (310). For example, server 110 receives (310) the request. In response to the request, data engine 111 accesses (312) content items 122a-122c, targeting conditions 132a-132c, and bid prices for content items 122a-122c.

In the example of FIG. 3, measures of relevance for content items 122a-122c are identified (314). For example, using the above described techniques, data engine 111 identifies (314) measures of relevance for content items 122a-122c. The measures of relevance are compared to a threshold value (not shown). For example, data engine 111 compares (not shown) the measures of relevance to a threshold value. In an example, content items with measures above relevance above the threshold value are included in an auction. In this example, data engine 111 determines that measures of relevance for content items 122a-122c are above the threshold value.

In an example, targeting conditions 132a-132c are determined to be satisfied (316). For example, data engine 111 determines (316) that targeting conditions 132a-132c are satisfied. In this example, data engine 111 is configured to generate a determination regarding satisfaction of targeting conditions for content items 122a-122c with measures of relevance above the threshold value.

In an example, data engine 111 determines that targeting conditions 132a-132c are satisfied by determining a correspondence among conditions of network environment 100 and targeting conditions 132a-132c. Conditions of network environment 100 may include attributes of user 123, contents of content stream 116, contents of media program 121, a display of one or more of content items 122a-122c as a one-two punch content item and/or as a counter punch content item, and so forth.

In determining whether conditions of network environment 100 satisfy targeting conditions 132a-132c, data engine 111 may identify attributes of user 123. In this example, the above-described request for content items includes information identifying user 123, including, e.g., a user identifier for user 123 in the social networking service. Using the information identifying user 123, data engine 111 accesses, in data repository 112, information specifying attributes of user 123, including, e.g., a profile of user 123 in the social networking service. In an example, user 123 may opt-in or may opt-out of having profile information accessed and used in selection of content items 122a-122c for display in content stream 116.

In another example, the request for content items includes information identifying content stream 116, e.g., an identifier of content stream 116. Using the information identifying content stream 116, data engine 111 accesses, in data repository 112, information associated with content stream 116, including, e.g., attributes of groups posting in content stream 116, contents of posts in content stream 116, and so forth.

In another example, data engine 111 determines that conditions of network environment 100 satisfy targeting condition 132a when content item 122a is displayed as a counter punch content item to content item 130. In this example, display of content item 130 during media program 121 is a pre-condition for display of content item 122a as a counter punch content item. In this example, when a content provider uploads content item 122a to server 110, the content provider specifies that content item 122a is a counter punch content item to content items of a competitor, including, e.g., content item 130.

In this example, data engine 111 selects content item 130 for display during media program 121. Upon selection of content item 130, data engine 111 determines that targeting condition 132a for display of content item 122a as a counter punch content item is satisfied.

In another example, data engine 111 determines that conditions of network environment 100 satisfy targeting condition 132a when contents of media program 121 correspond to a type of content specified in targeting condition 132a. Data engine 111 uses information received from media program device 104 in determining contents of media program 121.

In this example, a message (not shown) is transmitted (318). For example, media program device 104 transmits (318) to server 110 a message. The message includes information specifying a station through which media program 121 is accessed by media program device 104. In this example, data engine 111 accesses a data repository (e.g., data repository 112 or another, external data repository) specifying associations among stations and media programs. From a query of the data repository, data engine 111 identifies that media program 121 is associated with the station being accessed by media program device 104. Following identification of media program 121, data engine 111 may determine whether media program 121 includes a type of content corresponding to the type of content specified in targeting condition 132a.

Bid prices of content items 122a-122c are adjusted (319). For example, when conditions in network environment 100 satisfy targeting conditions 132a-132c, data engine 111 adjusts (319) bid prices of content items 122a-122c. In this example, data engine 111 increases the bid price for content item 122a in accordance with information associated with targeting condition 132a, e.g., as indicated in the above Table 1.

An auction including content items 122a-122c is executed (320). For example, using the bid prices for content items 122a-122c and the measures of relevance for content items 122a-122c, data engine 111 executes (320) an auction for content items 122a-122c. In an example, data engine 111 executes the auction by generating selection scores for content items 122a-122c, as previously described.

Content items 122a-122c are selected for display in slots 124a-124c (322). For example, based on results of the auction, data engine 111 selects (322) content items 122a-122c for display in slots 124a-124c. In an example, data engine 111 selects a pre-defined number of content items with selections scores that are higher than the selection scores of other content items participating in the auction. The pre-defined number of content items is based on a number of slots 124a-124c.

Content items 122a-122c are sent for display in slots 124a-124c of content stream 116 (not shown). For example, server 110 sends (not shown) content items 122a-122c to client device 103 for display in slots 124a-124c of content stream 116. Content items 122a-122c are displayed in slots 124a-124c of content stream 116 (324). For example, client device 103 displays (324) content items 122a-122c in slots 124a-124c of content stream 116.

In an example, data engine 111 repeats actions 314, 316, 319, 320, 322, e.g., during a time in which contents of content stream 116 are updated. Data engine 111 updates in real-time the content items for display in content stream 116, e.g., based on real-time changes in the content of content stream 116, based on real-time changes in users posting to content stream, based on real-time changes in groups posting to content stream, based on real-time changes in content of media program 121, based on real-time changes in content of content item 130 being displayed during media program 121, and so forth.

In a variation of FIG. 3, data engine 111 determines that the conditions of network environment 100 satisfy targeting conditions 132a-132c of content items 122a-122c. Following this determination, data engine 111 generates measures of relevance for content items 122a-122c, e.g., for use in an auction.

Example Alternative System Implementations

Figure 4:
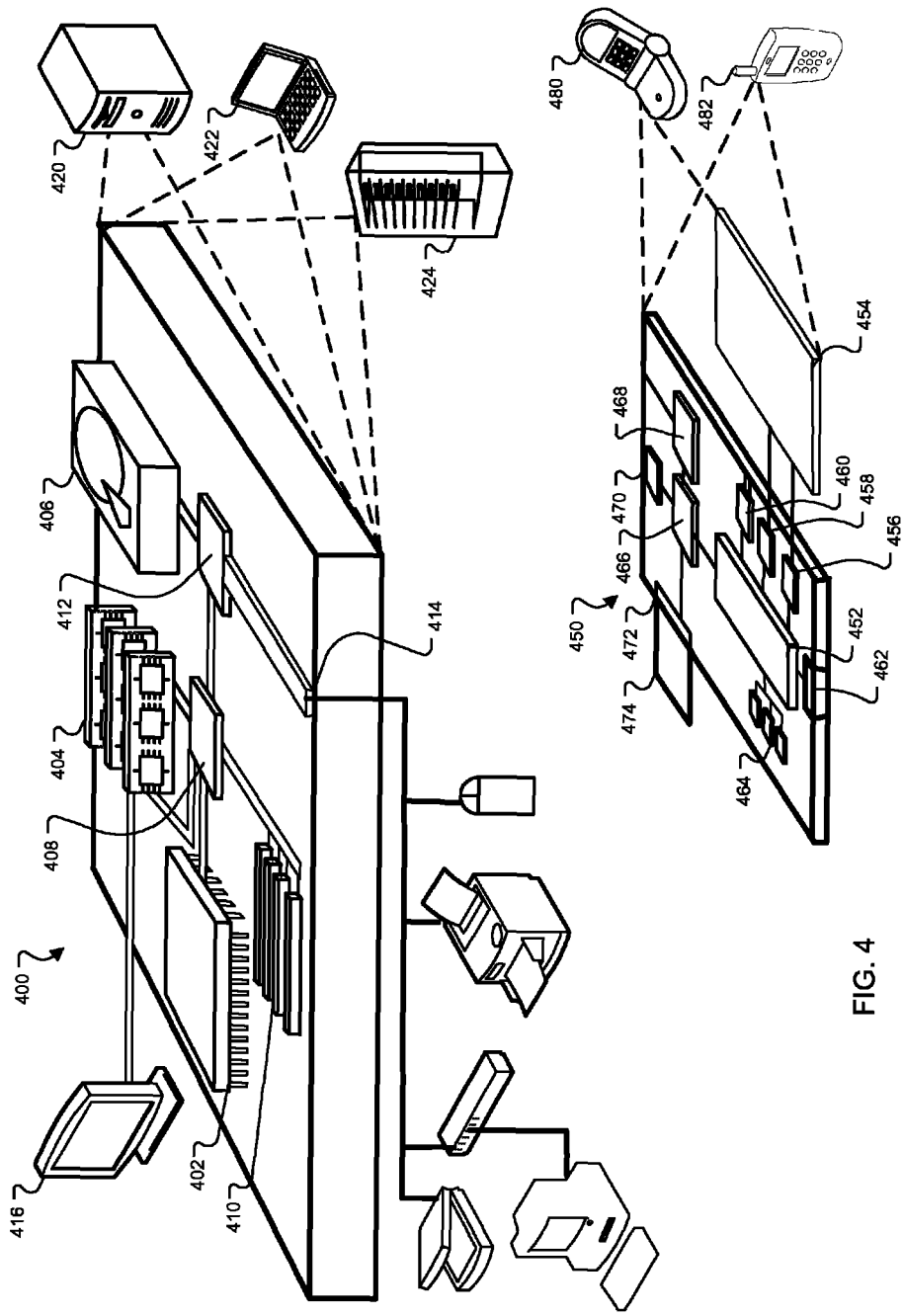
FIG. 4 shows an example of a computer device and a mobile computer device that can be used to implement the techniques described herein.

FIG. 4 shows an example of computer device 400 and mobile computer device 450, which can be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical data for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores data within computing device 400. In one implementation, memory 404 is a volatile memory unit or units. In another implementation, memory 404 is a non-volatile memory unit or units. Memory 404 also can be another form of computer-readable medium, such as a magnetic or optical disk.

Storage device 406 is capable of providing mass storage for computing device 400. In one implementation, storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, such as those described above. The data carrier is a computer- or machine-readable medium, such as memory 404, storage device 406, memory on processor 402, and the like.

High-speed controller 408 manages bandwidth-intensive operations for computing device 400, while low speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer such as laptop computer 422. In some examples, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes processor 452, memory 464, an input/output device such as display 454, communication interface 466, and transceiver 468, among other components. Device 450 also can be provided with a storage device, such as a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, such as control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other data to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores data within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other data for device 450. Specifically, expansion memory 474 can include instructions to carry out or supplement the processes described above, and can include secure data also. Thus, for example, expansion memory 474 can be provide as a security module for device 450, and can be programmed with instructions that permit secure use of device 450. In addition, secure applications can be provided via the SIMM cards, along with additional data, such as placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, such as those described above. The data carrier is a computer- or machine-readable medium, such as memory 464, expansion memory 474, and/or memory on processor 452, that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken data from a user and convert it to usable digital data. Audio codec 460 can likewise generate audible sound for a user, such as through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

For situations in which the systems and techniques discussed herein collect personal information about users, the users may be provided with an opportunity to opt in/out of programs or features that may collect personal information (e.g., information about a user's preferences or a user's current location). In addition, particular data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method for selecting content items, the method comprising:
   receiving, using one or more processing devices, a request for content items for display in a content stream;
   retrieving, using the one or more processing devices, in response to the request, conditions for targeting content items for display in the content stream, with each of the content items being associated with one or more of the conditions, and with each of the conditions specifying that one or more predefined events occur before display of an associated content item is targeted;
   wherein each of the conditions is associated with information specifying an adjustment to a bid price for display of an associated content item upon satisfaction of the condition, relative to the bid price for display of the associated content item in an absence of the condition;
   determining, using the one or more processing devices, measures of relevance for the content items, with a measure of relevance specifying a relevance of a content item to contents of the content stream;
   from among the content items, identifying a content item with a measure of relevance exceeding a threshold value;
   for the content item identified, determining, using the one or more processing devices, whether there is an occurrence of one or more predefined events that satisfies a condition for targeting the content item identified;
   adjusting, using the one or more processing devices, the bid price for the content item identified, when there is the occurrence of the one or more predefined events that satisfies the condition for the content item identified;
   executing, using the one or more processing devices, an auction, based on the bid price adjusted for the content item identified and further based on other bid prices for other content items in the auction;
   selecting, using the one or more processing devices, based on the auction, the content items for display in the content stream; and
   outputting, using the one or more processing devices, the content items selected to a display device.

2. The method of claim 1,
   wherein a measure of relevance for the content item identified is based on a satisfaction of the condition by one or more of attributes of a user viewing the content stream and attributes of the content stream.

3. The method of claim 1, wherein the content stream is designated for display of content related to a media program that is accessed by a viewer of the content stream.

4. The method of claim 3, wherein the condition for the content item identified comprises the content item identified being displayed in the content stream to counteract an effect of another, different content item displayed during the media program.

5. The method of claim 3, wherein the content item identified comprises a first content item, and wherein the condition for the content item identified comprises:
   the first content item being displayed in the content stream as a second content item is displayed during the media program.

6. The method of claim 3, wherein the condition for the content item identified comprises information indicative of a type of content to be targeted, and wherein the method further comprises:

receiving, from a device for display of the media program, information indicative of a station on which the media program is accessed;

identifying, based on the station, an identity of the media program accessed by the viewer; and determining, based on the identity of the media program, a correspondence between the type of content to be targeted and a type of content associated with the media program accessed by the viewer.

7. The method of claim 1, wherein the condition for the content item identified comprises one or more of:

one or more attributes of a viewer of the content stream;

one or more attributes of a group that is generating content for the content stream;

content that is posted in the content stream; and content of a media program that is accessed by the viewer of the content stream.

8. The method of claim 1, wherein at least one of the content items selected comprises a content item for which a respective condition is satisfied.

9. One or more non-transitory machine-readable hardware storage devices storing instructions that are executable by one or more processing devices to perform operations comprising:

receiving a request for content items for display in a content stream;

retrieving in response to the request, conditions for targeting content items for display in the content stream, with each of the content items being associated with one or more of the conditions, and with each of the conditions specifying that one or more predefined events occur before display of an associated content item is targeted;

wherein each of the conditions is associated with information specifying an adjustment to a bid price for display of an associated content item upon satisfaction of the condition, relative to the bid price for display of the associated content item in an absence of the condition;

determining measures of relevance for the content items, with a measure of relevance specifying a relevance of a content item to contents of the content stream;

from among the content items, identifying a content item with a measure of relevance exceeding a threshold value;

for the content item identified, determining whether there is an occurrence of one or more predefined events that satisfies a condition for targeting the content item identified;

adjusting the bid price for the content item identified, when there is the occurrence of the one or more predefined events that satisfies the condition for the content item identified;

executing an auction, based on the bid price adjusted for the content item identified and further based on other bid prices for other content items in the auction;

selecting, based on the auction, the content items for display in the content stream; and outputting the content items selected to a display device.

10. The one or more non-transitory machine-readable hardware storage devices of claim 9, wherein a measure of relevance for the content item identified is based on a satisfaction of the condition by one or more of attributes of a user viewing the content stream and attributes of the content stream.

11. The one or more non-transitory machine-readable hardware storage devices of claim 9, wherein the content stream is designated for display of content related to a media program that is accessed by a viewer of the content stream.

12. The one or more non-transitory machine-readable hardware storage devices of claim 11, wherein the condition for the content item identified comprises the content item identified being displayed in the content stream to counteract an effect of another, different content item displayed during the media program.

13. The one or more non-transitory machine-readable hardware storage devices of claim 11, wherein the content item identified comprises a first content item, and wherein the condition for the content item identified comprises:

the first content item being displayed in the content stream as a second content item is displayed during the media program.

14. The one or more non-transitory machine-readable hardware storage devices of claim 11, wherein the condition for the content item identified comprises information indicative of a type of content to be targeted, and wherein the operations further comprise:

receiving, from a device for display of the media program, information indicative of a station on which the media program is accessed;

identifying, based on the station, an identity of the media program accessed by the viewer; and determining, based on the identity of the media program, a correspondence between the type of content to be targeted and a type of content associated with the media program accessed by the viewer.

15. The one or more non-transitory machine-readable hardware storage devices of claim 9, wherein the condition for the content item identified comprises one or more of:

one or more attributes of a viewer of the content stream;

one or more attributes of a group that is generating content for the content stream;

content that is posted in the content stream; and content of a media program that is accessed by the viewer of the content stream.

16. The one or more non-transitory machine-readable hardware storage devices of claim 9, wherein at least one of the content items selected comprises a content item for which a respective condition is satisfied.

17. An electronic system comprising:

one or more processing devices; and one or more non-transitory machine-readable hardware storage devices storing instructions that are executable by the one or more processing devices to perform operations comprising:

receiving a request for content items for display in a content stream;

retrieving in response to the request, conditions for targeting content items for display in the content stream, with each of the content items being associated with one or more of the conditions, and with each of the conditions specifying that one or more predefined events occur before display of an associated content item is targeted;

wherein each of the conditions is associated with information specifying an adjustment to a bid price for display of an associated content item upon satisfaction of the condition, relative to the bid price for display of the associated content item in an absence of the condition;

determining measures of relevance for the content items, with a measure of relevance specifying a relevance of a content item to contents of the content stream;

from among the content items, identifying a content item with a measure of relevance exceeding a threshold value;

for the content item identified, determining whether there is an occurrence of one or more predefined events that satisfies a condition for targeting the content item identified;

adjusting the bid price for the content item identified, when there is the occurrence of the one or more predefined events that satisfies the condition for the content item identified;

executing an auction, based on the bid price adjusted for the content item identified and further based on other bid prices for other content items in the auction;

selecting, based on the auction, the content items for display in the content stream; and outputting the content items selected to a display device.

18. The electronic system of claim 17, wherein a measure of relevance for the content item identified is based on a satisfaction of the condition by one or more of attributes of a user viewing the content stream and attributes of the content stream.

19. The electronic system of claim 17, wherein the content stream is designated for display of content related to a media program that is accessed by a viewer of the content stream.

20. The electronic system of claim 19, wherein the condition for the content item identified comprises the content item identified being displayed in the content stream to counteract an effect of another, different content item displayed during the media program.

21. The electronic system of claim 19, wherein the content item identified comprises a first content item, and wherein the condition for the content item identified comprises:

the first content item being displayed in the content stream as a second content item is displayed during the media program.

22. The electronic system of claim 19, wherein the condition for the content item identified comprises information indicative of a type of content to be targeted, and wherein the operations further comprise:

receiving, from a device for display of the media program, information indicative of a station on which the media program is accessed;

identifying, based on the station, an identity of the media program accessed by the viewer; and determining, based on the identity of the media program, a correspondence between the type of content to be targeted and a type of content associated with the media program accessed by the viewer.

23. The electronic system of claim 17, wherein the condition for the content item identified comprises one or more of:

one or more attributes of a viewer of the content stream;

one or more attributes of a group that is generating content for the content stream;

content that is posted in the content stream; and content of a media program that is accessed by the viewer of the content stream.

24. The electronic system of claim 17, wherein at least one of the content items selected comprises a content item for which a respective condition is satisfied.

\* \* \* \* \*